J. HARRISON.
Stove-Pipe.
No. 208,813. Patented Oct. 8, 1878.
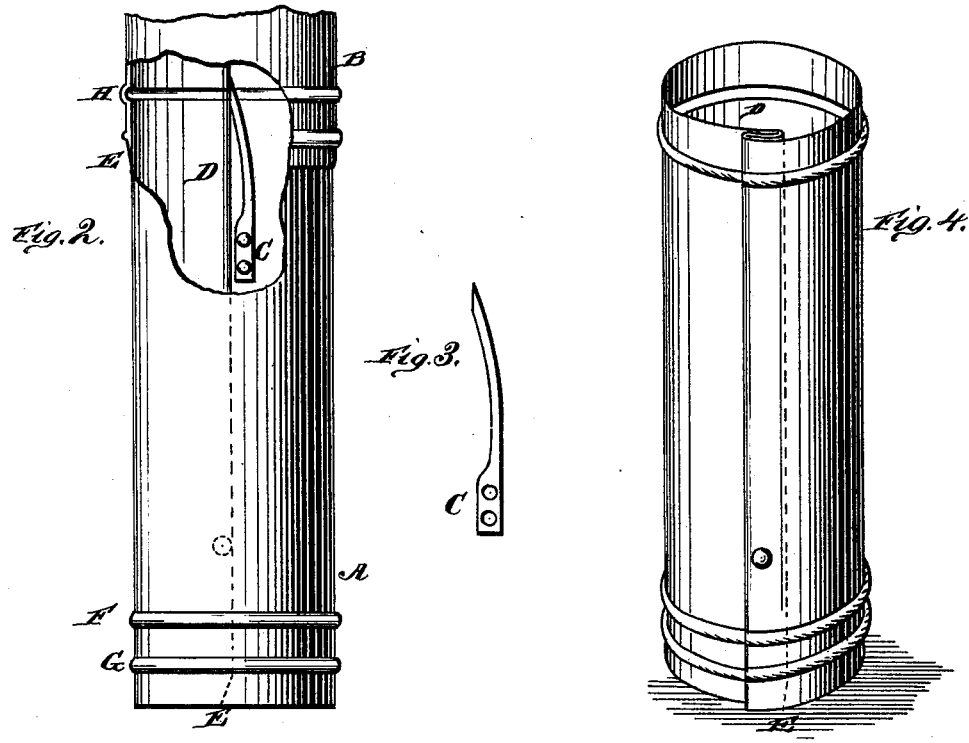
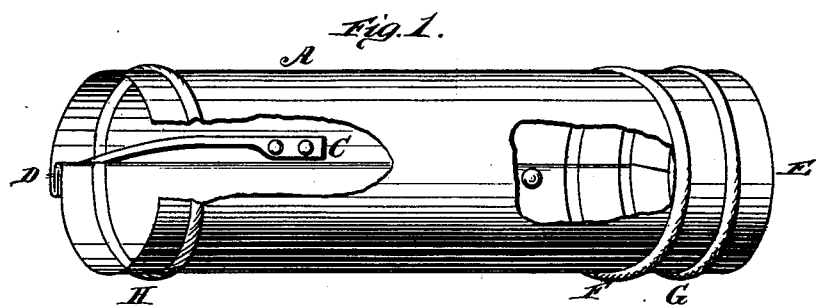
WITNESSES
Robert Everett
George E. Upham
INVENTOR
John Harrison.
Gilmore Smith & Co.
ATTORNEYS.

UNITED STATES PATENT OFFICE.

JOHN HARRISON, OF CLEVELAND, OHIO.

IMPROVEMENT IN STOVE-PIPES.

Specification forming part of Letters Patent No. 208,813, dated October 8, 1878; application filed January 23, 1878.

*To all whom it may concern:*

Be it known that I, JOHN HARRISON, of the city of Cleveland, Cuyahoga county, and State of Ohio, have invented certain new and useful Improvements in Stove-Pipes, of which the following is a specification:

Heretofore stove-pipes have been ordinarily constructed by flaring out the receiving end and drawing in the entering end of each length, and both ends of each length are rigid or firmly riveted, so that the least variation in their respective diameters renders them difficult and tedious of adjustment.

The object of my improvements is to furnish a stove-pipe (the one end of each length of which being free to be compressed) easily and readily put together by any person, forming a self-locking, tight joint, without the usual and well-known difficulties experienced in putting up the ordinarily-constructed rigid pipe.

The invention consists in constructing a joint of stope-pipe with a folding lap-bead and spring at one end, and a groove at the opposite end adapted to receive the bead, substantially as herein described and claimed.

In the accompanying drawing, in which similar letters of reference indicate like parts, Figure 1 is a view of a length of pipe broken away to show my improvement. Fig. 2 is a view of the same when inserted or connected together. Fig. 3 is a view of the spring, and Fig. 4 is a view of the movable lap.

Within each length of pipe A and B, constructed of any suitable material, and grooved or struck up at F and G at the lower or rigid end, and at H at the free end, is riveted a straight or slightly-curved spring, C, Fig. 3, constructed of steel or other suitable material, and placed adjacent to and parallel with the movable lap D, Fig. 4, and acting against the edge of said lap and near its upper extremity. This part H serves as a bead or rib, and when on duty fits within a groove, F G, and serves, in conjunction with spring C, to lock the two joints securely together.

Each length of pipe is constructed with a movable lap, D, Fig. 4, which is riveted at its lower or receiving end E, but is free to move throughout the rest of the length of said joint, thereby permitting compression of the upper or unriveted end.

It will be seen that by compressing the upper or entering end of the length of pipe A it is readily reduced in diameter, so as to be easily inserted into the lower or receiving end of the length of pipe B, and, pressing said length A upward, it locks itself by the action of the spring C against the edge of the movable lap D so soon as the groove H in length A reaches the groove G in length B, thus forming a close and securely-locked connection of pipe, and avoiding the necessity of wiring or other fastening.

By means of the second groove, F, in length of each pipe, at its receiving end, the connection may be lengthened or shortened to the extent of, say, two (2) inches on each length of pipe used.

The operation of my improvement, it will be seen, applies equally well to elbows and sheet-iron thimbles, the latter of which are usually inserted in chimney-flues for receiving stove-pipes, thus making a close-fitting, safe, and firm connection thereto, preventing the pipe from going too far in or slipping out of the chimney, and avoiding the necessity of wiring or other fastening.

It will be observed that my pipe is united longitudinally by a rivet at one end only, and the fold or lap D, which extends throughout the entire length of the section. Now, inasmuch as no pressing or soldering is applied to the pipe, I find it necessary to add the spring C to make and preserve a close joint, and thereby prevent leakage or displacement.

Heretofore in the construction of similar pipe, when one rivet only has been used, the fold or lap has been pressed to form a close joint and some of the pipe cut away to provide for a proper adjustment of the sections.

I am aware that joints of stove-pipe have been constructed in such manner as to permit them to be pressed together longitudinally by screw-clamps, and also that a wire spring has been employed in an intermediate coupling to aid in securing close joints. I do not claim, broadly, the construction of a stove-pipe fastened by one rivet only; but,

Having thus described my invention, and the operation of the same, what I claim as new, and desire to secure by Letters Patent, is—

In a stove-pipe riveted at one end only, the combination of the folding lap D, grooves F G, rib or bead H, and spring C, substantially as described.

JOHN HARRISON.

Witnesses:
CHAS. G. C. SAGERVOLL,
JAMES FITCH.